(12) United States Patent
Simcoe (10) Patent No.: US 7,035,220 B1
(45) Date of Patent: Apr. 25, 2006

(54) TECHNIQUE FOR PROVIDING END-TO-END CONGESTION CONTROL WITH NO FEEDBACK FROM A LOSSLESS NETWORK

(75) Inventor: Robert J. Simcoe, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 972 days.

(21) Appl. No.: 10/038,329

(22) Filed: Oct. 22, 2001

(51) Int. Cl.
G08C 15/00 (2006.01)

(52) U.S. Cl. .................................. 370/236; 370/252
(58) Field of Classification Search .................. None
See application file for complete search history.

(56) References Cited

U.S. PATENT DOCUMENTS

| | | | | |
|---|---|---|---|---|
| 5,633,859 | A * | 5/1997 | Jain et al. .................. | 370/234 |
| 5,793,768 | A * | 8/1998 | Keshav ....................... | 370/400 |
| 6,570,848 | B1 * | 5/2003 | Loughran et al. .......... | 370/230.1 |
| 6,795,401 | B1 * | 9/2004 | Fukuoka ..................... | 370/236 |
| 6,813,245 | B1 * | 11/2004 | Furuno ....................... | 370/236 |
| 2002/0080726 | A1 * | 6/2002 | Klassen et al. ............ | 370/252 |

OTHER PUBLICATIONS

Srinivasan Keshav, "Packet-Pair Flow Control", pp. 1-45, IEEE/ACM Transactions on Networking, Feb. 1995.
Srinivasan Keshav, "A Control-Theorectic Approach to Flow Control", Proc. ACM SigComm 1991, Sep. 1991.
Srinivasan Keshav, "Flow Control in High-Speed Networks with Long Delays", Proceddings of INET 1992, Kobe, Japan, Jun. 1992.
Constantinos Dovrolis, Parameswaran Ramanathan and David Moore, "What do packet dispersion techniques measure?". In Proceedings of IEEE INFOCOM, Apr. 2001.

* cited by examiner

*Primary Examiner*—Chau Nguyen
*Assistant Examiner*—Anthony Sol
(74) *Attorney, Agent, or Firm*—Blakely, Sokoloff, Taylor & Zafman LLP (57) ABSTRACT

A congestion management technique achieves an end-to-end data flow rate that is supported by a lossless communications network. The end-to-end rate extends from a source end node to destination end node of the network and is preferably at or slightly below a bottleneck rate of the network. The destination end node determines, on its own and without any help from network elements, a supportable rate of activity in the network and provides feedback to the source end node. By achieving such a rate, data transmitted by the source end node can flow through the network without loss of packets and without the use of substantial buffering.

20 Claims, 3 Drawing Sheets

TECHNIQUE FOR PROVIDING END-TO-END CONGESTION CONTROL WITH NO FEEDBACK FROM A LOSSLESS NETWORK

FIELD OF THE INVENTION

The present invention relates to communications networks and, more specifically, to a technique for controlling congestion in a lossless communications network.

BACKGROUND OF THE INVENTION

Communication in a computer network involves the exchange of data between two or more entities interconnected by communication links. These entities are typically software programs executing on computer platforms, such as end nodes and intermediate nodes. An example of an intermediate node may be a router or switch which interconnects the communication links to enable transmission of data between the end nodes, such as a server having processor, memory and input/output (I/O) storage resources.

Communication software executing on the end nodes correlate and manage data communication with other nodes. The nodes typically communicate by exchanging discrete packets or frames of data according to predefined protocols, such as the Transmission Control Protocol/Internet Protocol (TCP/IP). In this context, a protocol consists of a set of rules defining how the nodes interact with each other. In addition, network software executing on the intermediate nodes allows expansion of communication to other end nodes. Collectively, these entities comprise a communications network and their interconnections are defined by an underlying architecture.

The InfiniBand architecture is an I/O specification that defines a point-to-point, "switched fabric" technology used to, among other things, increase the aggregate data rate between processor and/or storage resources of a server or set of servers. The switched fabric generally comprises multiple point-to-point links that cooperate to provide a high-speed interconnect that may also be used to link individual servers into clusters to increase availability and scalability. The switched fabric technology may be embodied in an InfiniBand switch (hereinafter "IB switch") configured to receive data traffic (packets) from one or more input ports and forward that traffic to one or more output ports. A forwarding decision, i.e., the decision to switch a packet received at an input port to an output port, is rendered on an address contained in a predetermined field of the packet.

Regulation of data traffic over a communications network having finite resources is known as flow control. These resources may be measured in capacity, speed or any other parameter that can be quantified. A need for flow control arises whenever there is a constraint on the communication rate between two nodes due to a limited capacity of bandwidth or processing resources. At that time, a flow control scheme is required to prevent congestion and provide a high percentage of network utilization. Congestion occurs when two or more flows reach a common "bottleneck" point in the network that cannot support the total aggregate of the flows beyond that point. When that happens, the flows must be "throttled" down to a level that can be supported by the bottleneck point. Flow control is then used to communicate to the source the share of the bottleneck resource that is available for that source.

A simple conventional flow control scheme involves a destination end node (destination) sending a signal to a source end node (source) to essentially stop the source from transmitting its flow of data traffic over a link. This flow control scheme, referred to as link-level on/off flow control, involves the setting of a threshold level on a receive buffer at the destination. The destination generates a feedback flow control signal (e.g., an ON/OFF signal) that instructs the source to stop transmission of the data flow over the link when the threshold level is exceeded. Here, link level refers to a physical link between the source and destination nodes that, in this context, may further include switches. End-to-end control in this technique is achieved through a series of "hop-by-hop" link level flow controlled links acting in concert to control the flow of data from a primary source to an ultimate destination.

For correct operation, the simple link level flow control scheme requires that the depth of the receive buffer be equal to or exceed two round trip times (RTT) of the link. For example, assume the threshold on the buffer is set at one RTT. When the signal to stop occurs there must be one RTT of buffer remaining to capture data of the flow that is "in flight", i.e., the data traversing the link during the time it takes to send the stop signal to the source and drain the link once the source has stopped. Once the buffer at the destination empties to the one RTT level, a start signal can be sent to the source. Notably, there must be one RTT worth of data in the buffer to maintain the data flow until the start signal can reach the source and the source can fill the link to the receiver.

IB switches typically utilize flow control with very little buffering because the RTT for a link is typically very small. For example, the buffering in the switch is sized to a depth sufficient to accommodate the RTT delay of the link plus at least one packet because full packets are sent between the nodes. Thus, the size of the IB receive buffer must be sufficient to hold two maximum size packets because flow control information can only be sent on the return path between packets. This depth is needed to ensure that data is not lost, while maintaining full rate transmission over the link. For IB switches and a 2 kilobyte (KB) maximum transfer unit (MTU), the buffering needed is only 4 KB which is more than sufficient for RTTs of typically expected lengths of the links.

IB switches utilize a more sophisticated variant of on/off flow control referred to as credit-based flow control. Rather than utilizing a simple ON/OFF flow control signal, the switch uses a credit-based system. According to this scheme, the destination sends a message to the source indicating an amount of buffering (X) extended to the source for its transmission. That is, the destination extends "credits" (buffers) to the source for a data flow and it then reserves those buffers for that flow. The information contained in the message reflects the ability of the network to deliver data based on the amount of data that the receiving end (destination) can forward. Yet, that information always "lags" current network conditions because of the time it takes to generate and deliver the message. If the extended buffers are not sufficient to accommodate the RTT, this scheme still works because by allocating an exact amount of buffer space, the source does not send more data than it has been credited (hence, a credit-based scheme). In contrast, if the buffers in an on/off flow control scheme are not sufficient to cover the RTT, then it is possible to lose data due to buffer overrun.

Figure 1:
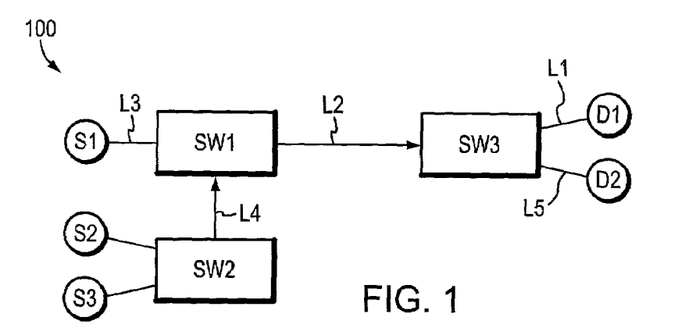
FIG. 1 is a schematic block diagram of a conventional communications network having a plurality of switches interconnected by point-to-point links.

A problem arises when the link-by-link flow control scheme is used in connection with a fair allocation bandwidth policy implemented by the switches of a network. FIG. 1 is a schematic block diagram of a conventional communications network 100 having a plurality of switches interconnected by point-to-point links. A source end node (S1) is connected to a first switch (SW1) and a plurality of source end nodes (S2, S3) is coupled to a second switch (SW2). In addition, there is a plurality of destination end nodes (D1, D2) coupled to a third switch (SW3). Assume that S1 and S2 send data to D1, while S3 sends data to D2.

As noted, the switches implement a type of fair allocation "arbitration" (e.g., round robin) of bandwidth for data flows received over the links that are destined for, e.g., D1 and D2. Such a policy ensures an even distribution of link bandwidth among each data flow. Assume further that there is 1× worth of bandwidth available over links L1 and L5, but 4× worth of available bandwidth over links L2 and L4. Since S1 and S2 are sending data to D1 (and ultimately over L1), ½× bandwidth of L2 is allocated to S1's data flow and ½× bandwidth of L2 is allocated to S2's data flow. Similarly, ½× bandwidth of L3 is allocated to S1's data flow and ½× bandwidth of L4 is allocated to S2's data flow.

Assume now S3 transfers data to D2. It would be desirable to allocate 1× bandwidth over each link coupling S3 to D2 so as to optimize that data flow. However, this is not possible even though L2 and L4 can easily accommodate such bandwidth. This is because the flow control scheme limits the bandwidth according to the fair arbitration policy operating on the switches. That policy fairly allocates ½× of L2 to S1 and S2, and proceeds to allocate the same bandwidth (½×) to S3's data flow. That is, notwithstanding an attempt by S3 to transmit 1× bandwidth over the network of links, the link-level flow control limits that flow to ½×. This is an example of a classic "parking lot" problem where local fairness does not lead to global fairness.

The parking lot problem is easily illustrated as a series of points in a parking lot where cars in different rows of the lot attempt to gain access onto a single exit roadway that runs through the parking lot to an exit. If at each point where the cars merge the drivers allow each other to alternate access to the exit road, the "fair" behavior of the drivers penalizes a driver at the back of the parking lot because that driver is allotted much less access to the exit road than a driver at the point closest to the exit.

Congestion points in an IP network are typically identified within IP switches by monitoring the average buffer (queue) length and either dropping or marking packets. This works because the data that cannot be sent through the bottleneck point will necessarily build-up in the switch buffers. Since the IB network switches have little buffering and link-by-link flow control, those switches are not designed to use the buffers to store data during a contention period; moreover, the switches are designed to specifically not drop any data and to stop the incoming data through link-by-link flow control. As a result, the buffering fills and empties too quickly for an average occupancy to be meaningful as a way to indicate congestion and dropping packets is not allowed as a way to provide feedback to the source. In this type of a network, the links are subject to congestion spreading effects if the end nodes do not reduce their outputs to an amount sustainable through a bottleneck rate of the network.

One way to solve congestion spreading is to separate flow control feedback by specific source. This is particularly useful within, e.g., an asynchronous transfer mode (ATM) switch, where there may be many virtual circuits (VC). A VC path is created having a specific identifier and the flow control information is sent per VC. This enables, e.g., S1 to transmit its flow at a rate that is different from S2. Flow control is thus not "tied" to arbitration and does not limit all flows.

Another solution is to allow short-term congestion spreading in the presence of "long-term" flows, but to use a longer response time, end-to-end flow control mechanism to adjust the long-term flows to a rate that the network can sustain without exhausting the short-term resources. A long-term flow is a flow that lasts much longer than an end-to-end, RTT through the network, e.g., multiple round trip times. That is, long term is measured by a flow that lasts long enough to allow control by feedback from the ultimate destination end node, similar to TCP. Control of a long-term data flow can be subject to a closed-loop control system, but the response time of the loop must be many round trip times. Such a system must consider a control loop time equal to the many RTT plus the processing time $P_{time}$ at both nodes. The data to be sent must take a time to send that is also substantially greater than the RTT and $P_{time}$ or there will be nothing to control.

Congestion arises when a flow of transmitted data meets another flow at a point that both must share such that data "backs up" the receive buffer at this point, requiring flow control back to the source. In this case, an end-to-end flow control scheme may be used to "throttle" the flow to a rate that is supported by the network. However, the network-supported rate may change over time. The present invention is directed to controlling "long-term" flows such that, if these flows last long enough, information pertaining to the supported rate is substantially correct (current) and useful in controlling the source.

Known schemes for end-to-end congestion management generally rely on network feedback in the form of dropped packets or marked packets that would have been dropped at network switches. For these schemes it is assumed that the network switches have substantial buffering and that the switches can measure the average utilization of those buffers. Thereafter, when the average exceeds a threshold, packets are randomly either dropped or marked, or eventually the buffers fill and overflow, resulting in lost packets.

A problem with using such schemes in an IB communications network is the desired property of the network that it specifically avoid the loss of packets. With buffering only for delays associated with transmitting flow control information back to the source of a link and no packet loss, it is not feasible to use these prior art schemes in an IB switch to identify congestion and mark packets. The present invention is directed to a technique that reduces congestion and congestion spreading in the presence of long-term flows traversing a "lossless" communications network configured to avoid packet loss.

One known end-to-end flow control system utilizes a packet-pair, rate-based feedback flow control scheme disclosed in a paper titled, *Packet-Pair Flow Control*, by S. Keshav, IEEE/ACM Transactions on Networking, February 1995. Keshav discloses the use of packet pairs in a control loop to estimate a system state, e.g., by measuring throughput of the network, which estimation is critical in enabling the control scheme. A source node uses smoothed measurement of arrival times of acknowledgements of the packet pairs to adjust the throughput rate either up (increase) or down (decrease) in the TCP domain. This scheme, like the one disclosed herein, does not rely on feedback from network switches or routers to identify congestion on a data path. However, this scheme uses complex estimators and relies only on those estimators for setting specific transfer rates. Subsequent work showed practical difficulties in using an averaged inter-packet gap as a sole control variable.

SUMMARY OF THE INVENTION

The present invention comprises a congestion management technique for achieving an "end-to-end" data flow rate that is supported by a lossless communications network, such as an InfiniBand (IB) communications network. The end-to-end rate extends from a source end node to destination end node of the network and is preferably at or slightly below a bottleneck rate of the network. The destination end node ("destination") determines, on its own and without any help from the network, a supportable rate of activity in the network and provides feedback to the source end node ("source"). By achieving such a rate, data transmitted by the source can flow through the network without loss of packets and without the use of substantial buffering or invoking complementary short-term link-by-link flow control.

In the illustrative embodiment, the destination measures the network throughput over a predetermined time interval, measures the arrival intervals of packet pairs to determine if the network might support a higher rate and communicates that information back to the source. This communication can be in the form of end-to-end credits through the network. These end-to-end credits enable transmission of a specific amount of data by the source over the time interval. The novel technique preferably employs a type of token or leaky bucket to "pace" the use of credits over the time interval so not all data is sent at the beginning or the end of the interval.

Specifically, the source initiates a data flow to the destination by sending the paced out data as packet pairs, i.e., two packets, back-to-back. Thus, the end-to-end credits are used up as packet pairs over the time interval at the source. The destination measures the amount of data received over the time interval to thereby determine the amount of data that has traversed the network over that interval. In addition, the destination measures a packet "gap" for each packet pair to determine if the network capacity has perhaps increased. The destination further calculates an expected packet gap based on previously extended credits and determines if the measured packet gap is equal to or greater than the expected gap, or less than that gap.

The combination of the calculation and measurements allows the destination to inform the source whether to decrease or increase the amount of data sent during a next time interval. If the measured data throughput is less than expected, then the credits extended for the next interval can be decreased accordingly. If the measured throughput is equal to the extended credits, then the measured packet gap is used to determine if it is possible to increase the credits. If the measured gap is less than expected, then the destination can extend more credits to probe the network capacity with a reasonable expectation that it will not induce congestion.

More specifically, the time between reception of the end of the first packet of the pair to reception of the beginning of the second packet of the pair (the gap) is measured to determine whether adjustment of the rate is necessary. A plurality of these individual measurements may then be averaged for packet pairs received during the time interval. Thus, even though the packets are sent as a pair from the source, the network may separate them and the amount of separation (in time) is measured at the destination.

Advantageously, the present invention provides a technique that prevents the source from transmitting more data into the network than a network bottleneck can sustain, thereby obviating injection of excess data into the network. The invention also provides a mechanism to determine a flow rate level that the network can support and communicate that level to the source. Moreover, the determination is made on a regular basis so that subsequent flows can be adjusted to either increase or decrease their rates based on the most current conditions.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 2:
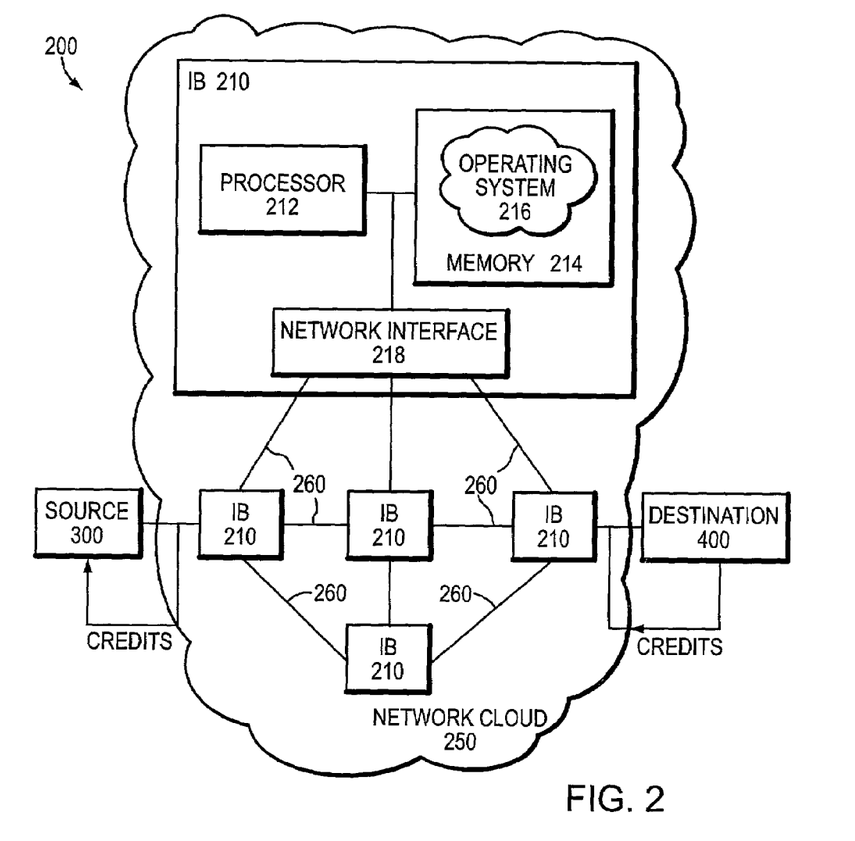
FIG. 2 is a schematic block diagram of a communications network, including a source end node coupled to a destination end node, which may be advantageously used with the present invention.

FIG. 2 is a schematic block diagram of a communications network 200, such as an InfiniBand (IB) communications network, that may be advantageously used with the present invention. The network 200 comprises a source end node (source) 300 and a destination end node (destination) 400 interconnected by a network cloud 250 of communication links 260 coupled to intermediate nodes 210. The links 260 are preferably point-to-point, unidirectional links arranged in a full-duplex communication configuration and capable of accommodating different transfer data rates or speeds. The nodes are computers that may be embodied as servers (end nodes) and/or intermediate nodes (routers or switches).

Each node, e.g., intermediate node 210, comprises a plurality of interconnected resources, including a processor 212, a memory 214 and an input/output device, such as a network interface 218. The memory 214 may comprise storage locations addressable by the processor and interface for storing software programs and data structures associated with the inventive technique described herein. The processor may comprise processing elements or logic for executing the software programs and manipulating the data structures. An operating system 216, portions of which are typically resident in memory and executed by the processor, functionally organizes the node by, inter alia, invoking network operations in support of software processes executing on the node. It will be apparent to those skilled in the art that other processor and memory means, including various computer readable media, may be used for storing and executing program instructions pertaining to the technique described herein.

The network interface 218 comprises the mechanical, electrical and signaling circuitry needed to interconnect the nodes over the links 260 of the network 200. The interconnection among the nodes is defined by an underlying architecture that, in the illustrative embodiment described herein, is preferably a "switched fabric" technology of the InfiniBand architecture. The point-to-point links 260 cooperate to provide a high-speed interconnect fabric used to couple end nodes and intermediate nodes, such as servers and switches, to increase the aggregate data rate between those nodes. The switched fabric technology may be embodied in InfiniBand switches (hereinafter "IB 210") disposed within the network cloud 250 and configured to receive data traffic (packets) from one or more input ports and forward that traffic over one or more output ports.

Regulation of data traffic generated by the source 300 over the network 200 and targeted for the destination 400 is referred to as flow control. As described herein, the nodes preferably utilize a credit-based flow control mechanism. This mechanism enables the destination to extend "end-to-end" credits (buffers) to the source for a data packet flow and then reserve those buffers for that flow. The end-to-end credits enable transmission of a specific amount of data by the source over a predetermined time interval. It should be noted that the end-to-end credits are unrelated to the link-by-link credits of the flow control mechanism. A flow control feedback message is sent by the destination to the source indicating an amount of buffering extended to the source for its packet flow. The message is preferably sent in-band, i.e., over a return path link, of the network cloud 250.

The time interval for the transmission of a data flow between the source 300 and destination 400 essentially creates a control loop. The credit-based flow control mechanism enables transmission of a predetermined amount of data within the time interval. At initialization, the source can send as much data as desired within the interval and the flow control mechanism responds by sending credits to the source. For example, at the beginning of a flow, full credits are extended to the source. The beginning of a flow is defined as subsequent to the termination of a previous flow and after the link has been quiet ("dead") for at least a time interval. At the end of the interval, the source receives a feedback message from the destination indicating the amount of data credited to the source for the next time interval.

Feedback provided from the destination to the source limits the amount of traffic credit available to the source under the assumption that the flow is long term and the network is relatively stable for the time interval. This assumption is reasonable considering that the feedback information is not "real time" because of network delays. This approach thus provides a means for allowing the source to start "high" and drive down to a level that the network can support.

In order to maintain a stable control loop, the amount of data driven over the network by the source must decrease quickly and increase slowly to provide an average rate equivalent to the rate supportable by the network. The mechanism described above adjusts the flow rate down (lowers the rate) to a level equal to the rate at which the data was transmitted through the network at the last time. That is, the mechanism is responsive to the network being more congested, thereby forcing the rate lower; it does not, however, provide a means to increase (raise) the flow rate. One way to increase the flow rate is to constantly drive more data over the network. However, this may result in flow control adjusting the data flow by constantly "throttling" (stopping) data transmission from the source. The present invention is directed to a technique that provides a flow rate that obviates such constant adjustment of data transmission over a lossless network.

Broadly stated, the present invention comprises a congestion management technique for achieving an "end-to-end" data flow rate that is supported by the IB communications network 200. The end-to-end rate extends from the source 300 to destination 400 and is preferably at or slightly below a bottleneck rate of the network. In this context, the bottleneck rate is defined as the rate (speed) of the slowest link in the cloud 250. The destination determines, on its own and without any help from the network, a supportable rate of activity in the network and provides feedback to the source. By achieving such a rate, data transmitted by the source can flow through the network without loss of packets and without the use of substantial buffering or invoking complementary short-term link-by-link flow control. However when used in conjunction with a network that employs link-by-link flow control, the combination can provide a network that does not lose packets and limits congestion spreading or collapse to a short time interval to which the end-to-end flow control loop is unresponsive.

Figure 3:
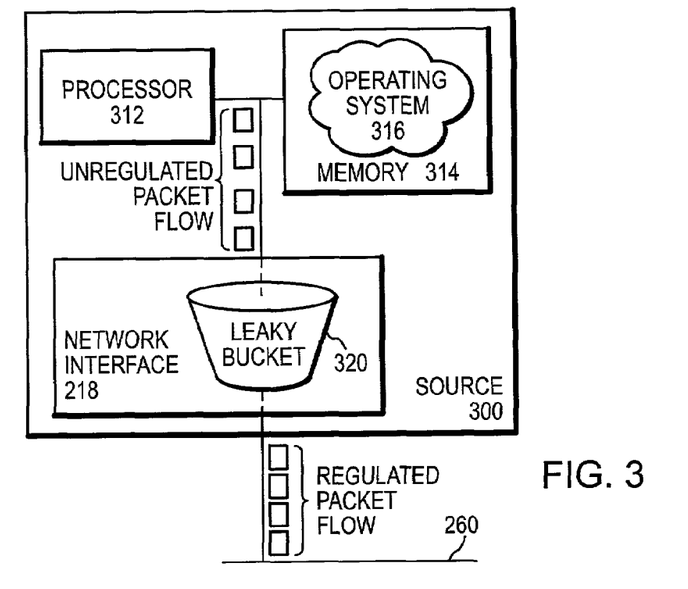
FIG. 3 is a schematic block diagram of the source end node configured to implement a credit-based flow control aspect of a congestion management technique according to the present invention.

FIG. 3 is a schematic block diagram of the source end node 300 configured to implement the credit-based flow control mechanism of the inventive technique. The credit-based flow control mechanism is preferably implemented as a type of token or leaky bucket to regulate (i.e., "pace out") the credited data over a predetermined time interval. Here, a processor 312 of the source is connected to a network interface 318 configured with a conventional "leaky bucket" queue 320.

Broadly stated, the processor is allowed to transfer unregulated packets through the leaky bucket 320 and onto the network link 260 as a regulated data flow, enforced either by the interface 318 or operating system 316. The data flow preferably comprises a packet stream having a beginning and end of flow indication. The leaky bucket is configured to pace out the data packets over the time interval, i.e., not all packets are sent at the beginning or the end of the interval. The regulated, paced-out data flow initiated by the source 300 is preferably sent to the destination as packet pairs, i.e., two packets, back-to-back. Each packet of a pair is marked as a first or second packet of the pair. Thus, the end-to-end credits are used up as packet pairs over the time interval.

Figure 4:
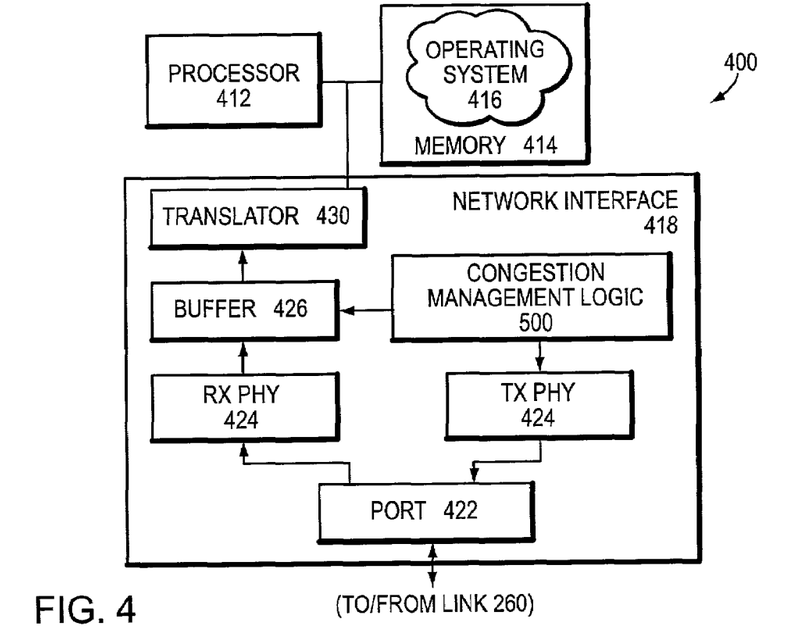
FIG. 4 is a schematic block diagram of the destination end node configured to implement the congestion management technique according to the present invention.

FIG. 4 is a schematic block diagram of the destination end node 400 configured to implement the congestion management technique according to the present invention. The destination 400 includes a network interface 418 having a translator circuit 430 that converts conventional InfiniBand input data formats to an internal protocol format for transfer to a processor 412. For example, input data packets are received from an InfiniBand interface port 422 and forwarded to a conventional receive physical layer (RX PHY) device 424 prior to storage in a buffer 426. The data is then forwarded to the translator 430, where it is converted to an internal format and forwarded to the processor.

A fundamental observation is that over the predetermined time interval, the number of packets arriving at the destination and the time period between such arrivals can be used to determine whether to decrease or increase credits sent from the destination to the source. As described herein, these credits are generated at the network interface 418 of the destination and forwarded over a conventional transmit physical layer (TX PHY) device 428 to the network link 260. The predetermined time interval may comprise a plurality of, e.g., ten, maximum packet "times" at the slowest link speed of the network. This ensures that the interval is sufficiently longer than the round trip time (RTT) of the data path so that control actions can achieve different rate adjustments. Initially, buffer credits that allow full speed, back-to-back packets over the time interval can be extended to the source by the destination 400. As packets start arriving, the destination can measure the number of packet pairs (or amount of consumed buffer 426) that arrive in the time interval and the average time interval between those packet pairs.

For the next time interval the number of credits extended can be reduced to the amount of buffer 426 consumed in the previous time interval. This causes the flow of data from the source to match the throughput that the network could deliver in the past. However, this mechanism only "slows down" the rate of data flow from the source. To make the control loop operate correctly, the mechanism must also recognize when the source can increase its flow rate. Such a mechanism must be able to determine if data injected into the network is actually arriving faster than expected at the destination.

Figure 5:
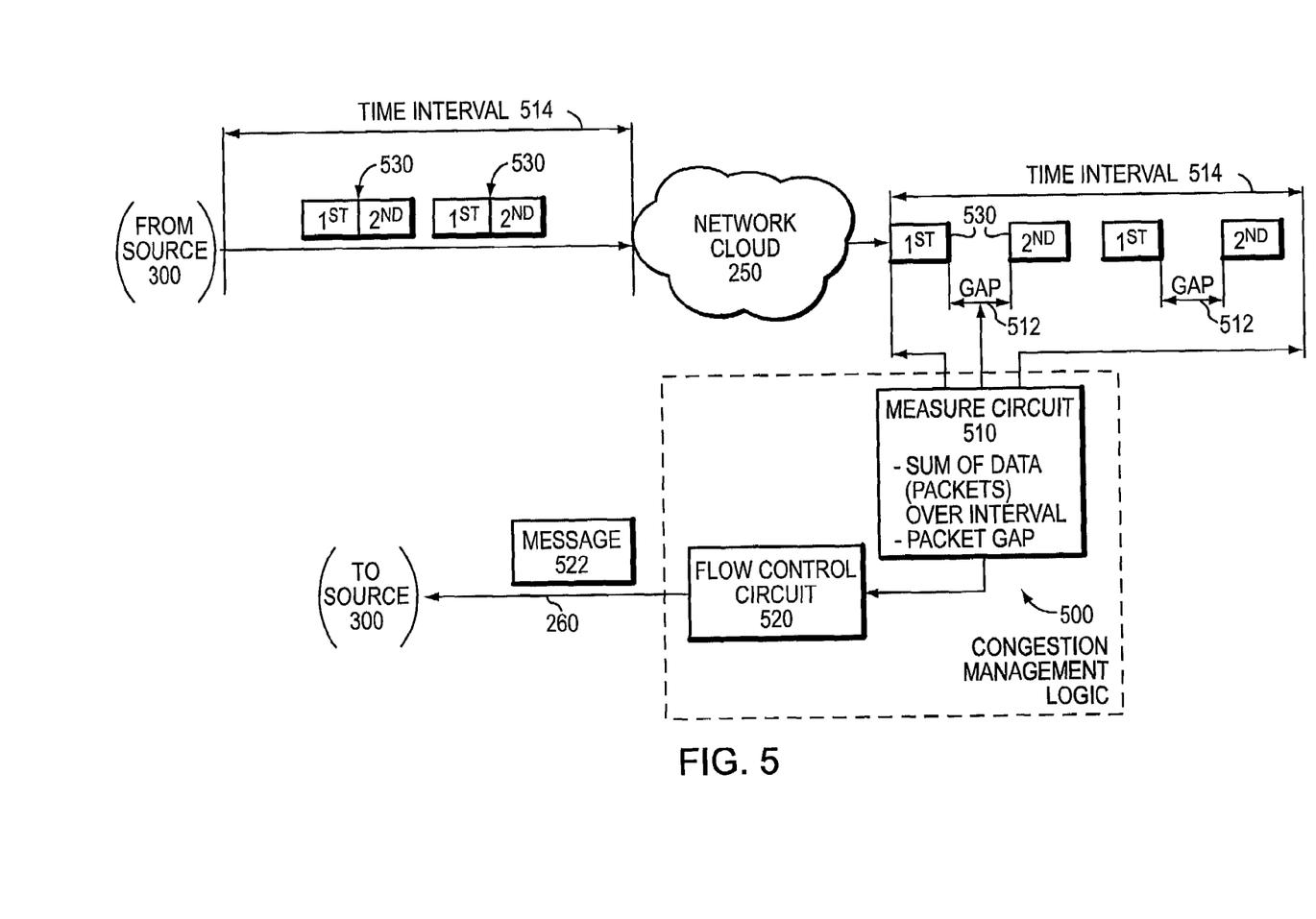
FIG. 5 is a schematic block diagram of congestion management logic that may be advantageously used in accordance with the present invention.

According to an aspect of the inventive technique, the destination 400 measures the network throughput over the predetermined time interval, measures the arrival intervals of packet pairs to determine if the network might support a higher rate and communicates that information back to the source 300 in the form of end-to-end credits. To that end, the destination includes congestion management logic 500 configured to measure the amount of data (e.g., the data throughput) received during the time interval to thereby determine the amount of data that has traversed the network over that interval. In addition, the destination measures a packet "gap" for each packet pair to determine if the network capacity has perhaps increased. The destination further calculates an expected packet gap based on previously extended credits and compares the measured packet gap with the expected gap to determine if the measured packet gap is equal to or greater than the expected gap, or less than that gap.

The combination of the calculation and measurements allows the destination to inform the source whether to decrease or increase the amount of data sent during a next time interval. If the measured data throughput is less than expected, then the credits extended for the next interval can be decreased accordingly. If the measured throughput is equal to the extended credits, then the measured packet gap is used to determine if it is possible to increase the credits. If the measured gap is less than expected, then the destination can extend more credits to probe the network capacity with a reasonable expectation that it will not induce congestion.

FIG. 5 is a schematic block diagram of the congestion management logic 500 including a measure circuit 510 coupled to a flow control circuit 520. The measure circuit 510 comprises conventional logic circuitry, such as counters, configured to measure the amount of traffic received from the source over the predetermined time interval 514. The amount of measured traffic is provided to the flow control circuit 520 that, in cooperation with the measure circuit 510, implement the credit-based flow control mechanism that calculates credits extended to the source for its data flow. To that end, the flow control circuit 520 comprises conventional logic, such as comparators, configured to perform the calculation and generate a feedback indication (message 522) indicating the amount of credit (space in buffer 426) extended to the source for its subsequent flow.

In addition, the measure circuit 510 is configured to measure the time, i.e., gap 512, between reception of the end of the first packet ($1^{st}$) of a packet pair 530 to reception of the beginning of the second packet ($2^{nd}$) of the pair to determine whether adjustment of the rate is necessary. A plurality of these individual measurements may then be averaged for packet pairs 530 received during the time interval 514. Thus, even though the packets are sent as a pair from the source, the network cloud 250 may separate them and the amount of separation or gap 512 (in time) is measured at is the destination 400.

Specifically, the difference in the arrival time of a last byte of the first packet and a first byte of the second packet indicates whether the network can deliver packets faster than expected along a path of links 260 carrying the data flow. According to the novel technique, if packets of a pair 530 are transmitted back-to-back from the source 300 over the network cloud 250, network congestion causes the packets to be delivered to the destination 400 with a time difference that is proportional to the network bottleneck rate at that time. If the second packet of a pair is received closer in time than the time at which the measured rate indicates it should arrive, it is likely that the network can sustain a higher rate. The feedback message 522 from the flow control circuit 520 to the source can thus specify more credit than was received over the time interval.

Calculation of the expected gap between packets may be effected as follows. During a first interval of measurement, the credits extended to the source allow the source to send back-to-back packets for the entire time interval so the expected data is the number of bytes in the time interval and the expected packet gap is zero. During this first interval, the circuit 510 measures the amount of received data; this measurement is the amount of credit extended to the source for a second time interval. The gap for the second interval is then calculated by dividing the number of bytes received by the maximum packet length. The integer portion of this division reflects the number of full packets received in the time interval. The number of bytes in the time interval minus the number of bytes received gives the total "dead" time of the interval. The total dead time divided by the number of packets gives the shortest expected gap (the gap may be longer depending on the alignment of packets and gaps in the interval). This may be calculated during the measurement time interval.

At the end of the second time interval, if the measured data received is less than the credits extended for that time interval then the credits to be extended for the next interval is equal to the measured received data and the gap measurement is ignored. If the measured received data is equal to or greater than the extended credits (it may be greater because of previously stored data in the network) then the gap measurement is checked. However if the measured shortest gap is significantly less than the expected shortest gap, then it is likely that there is more bandwidth available in the network path. Accordingly, the credits extended for the next time interval can be the previously extended credits plus an amount designed to probe the network for more bandwidth. The additional credit extended can be a fixed amount (e.g., X credits), a proportional amount (e.g., ½ of the difference between full speed and the previous rate), or a function of the difference between the expected gap and the measured gap. These calculations and measurements are then repeated for each ongoing time interval.

If the calculations change per measurement, it may be desirable to average the changes over a predetermined period of time, using a simple and efficient technique that can be easily implemented in, e.g., hardware at the destination. For example, the time interval may be a multiple of two (2) packets and the calculations may be performed in base 2, so that averaging can be effected by a simple shifting of bits. That is, the separation times can be measured, added, left-shifted and essentially averaged over a plurality (e.g., 3 or 4) of samples. Such averaging also depends upon the frequency of feedback messages returned to the source.

Advantageously, the combination of the measurements and calculations described above allows the source to adjust its data injection rate both up and down to match a flow rate supportable by the network, as reflected by a short time in the past. Since only long-term flows need to be controlled, only maximum size packets need to be measured. Individual packets, or packets that are substantially smaller than the maximum size, indicate that the flow is either finished or does not last long enough to require control.

While there has been shown and described an illustrative embodiment for achieving an end-to-end data flow rate that is supported by a communications network, it is to be understood that various other adaptations and modifications may be made within the spirit and scope of the invention. For example, in an alternate embodiment, the source 300 may transmit the packets of each pair in a manner such that the packets are spaced evenly (in time) over the network 200. Upon reception of the packets at the destination 400, the circuit measure 510 measures the amount of separation or gap 512 between them.

If the amount of separation (in time) that the packets arrive at the destination is less than the amount of separation (in time) the packets are spaced evenly upon transmission, then it can be inferred that there is more capacity (i.e., less congestion) in the network. If the amount of separation at the destination is greater than or equal to the amount of separation at the source, then the rate is sufficient. If the separation time is substantially greater, fewer measurements will occur within the total time interval. Notably, the destination performs the calculation based upon knowledge of how the source transmits the packet pairs. These measurement and comparison operations preferably occur for all active flows from the source to destination.

In sum, the present invention uses packet pairs to determine whether the network can support an increased transmission rate, as opposed to measuring the actual throughput rate of the network. To that end, the packet pairs are employed at end nodes and as a control loop. In addition, the invention applies the packet pairs to a link-level flow control network environment wherein the "gap" or separation time of each packet pair is measured solely at a destination to determine if it is feasible to increase the flow rate.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for achieving an end-to-end data flow rate supported by a communications network having a source and a destination interconnected by communication links, the method comprising the steps of:
    initiating a data flow at the source over the links, the data flow comprising a plurality of packet pairs;
    measuring an amount of data received at the destination over a predetermined time interval;
    measuring a packet gap for each packet pair received at the destination over the predetermined time interval; and
    determining, in response to the measured data and packet gap, a supportable data flow rate in the network so that the data flow initiated by the source can flow through the network without loss of data.

2. The method of claim 1 wherein the end-to-end data flow rate extends from the source to the destination of the network, the data flow rate being at or below a bottleneck rate of the network.

3. The method of claim 1 wherein the step of determining further comprises the step of providing feedback to the source.

4. The method of claim 3 wherein the step of providing feedback further comprises the step of communicating the supportable data flow rate to the source in the form of end-to-end credits extended to the source.

5. The method of claim 4 wherein the end-to-end credits enable transmission of a specific amount of data by the source over the predetermined time interval.

6. The method of claim 5 further comprising the steps of:
    calculating an expected packet gap based on previously extended credits; and
    determining if the measured packet gap is equal to or greater than the expected gap, or less than the expected gap.

7. The method of claim 6 wherein the steps of measuring and calculating allows the destination to inform the source whether to decrease or increase the amount of data flow during a next time interval.

8. The method of claim 7 further comprising the steps of:
    if the measured data is less than expected, decreasing the credits extended to the source for the next interval;
    if the measured data is equal to the extended credits, using the measured packet gap to determine whether to increase the credits; and
    if the measured gap is less than expected, extending more credits from the destination to the source to thereby probe the network capacity.

9. The method of claim 8 further comprising the steps of:
    providing a credit-based flow control mechanism; and
    pacing out the data over the time interval in accordance with the credit-based flow control mechanism.

10. The method of claim 9 wherein the step of providing the credit-based flow control mechanism comprises the step of implementing the credit-based flow control mechanism as a leaky bucket.

11. The method of claim 9 wherein the paced out data is sent by the source in groups of two packets, back-to-back.

12. The method of claim 1 wherein the step of measuring the packet gap further comprises the step of averaging a plurality of packet gap measurements performed at the destination during the time interval.

13. A system adapted to achieve an end-to-end data flow rate supported by a communications network having a source and a destination interconnected by communication links, the system comprising:
    a credit-based flow control mechanism configured to regulate packe pairs of a data flow over a predetermined time interval; and
    congestion management logic configured to measure an amount of data received at the destination that has traversed the network over the time interval and to measure a packet gap for each received packet pair to determine if capacity of the network has increased, the congestion management logic further calculating an expected packet gap and determining if the measured packet gap is equal to or greater than the expected gap, or less than the expected gap wherein a combination of the calculation and measurements allows the destination to inform the source whether to decrease or increase the amount of data sent during a next time interval.

14. The system of claim 13 wherein the congestion management logic comprises:

a measure circuit configured to measure the amount of data received form the source and the packet gap over the predetermined time interval; and a flow control circuit coupled to the measure circuit, the flow control circuit configured to determine credits extended to the source for a subsequent data flow in response to the amount of measured data and the measured gap.

15. The system of claim 14 wherein the flow control circuit is further configured to generate a feedback message indicating the credits extended to the source for its subsequent data flow.

16. The system of claim 15 wherein the measure circuit is further configured to measure the packet gap between reception of an end of a first packet of the packet pair to reception of a beginning of second packet of the packet pair to determine whether adjustment of the end-to-end data flow rate is necessary.

17. The system of claim 16 wherein the measure circuit is further configured to average a plurality of the packet gap measurements over the predetermined time interval.

18. The system of claim 17 wherein the data sent under credit-based flow control is paced by a leaky bucket mechanism.

19. Apparatus for achieving an end-to-end data flow rate supported by a communications network having a source and a destination interconnected by communication links, the apparatus comprising:

means for initiating a data flow at the source over the links, the data flow comprising a plurality of packet pairs paced out over a predetermined time interval;

means for measuring an amount of data received at the destination over the predetermined time interval;

means for measuring a packet gap for the packet pairs at the destination over the predetermined time interval;

means for calculating an expected packet gap based on previously extended credits;

means for determining if the measured packet gap is equal to or greater than the expected gap, or less than the expected gap; and means for determining, in response to the means for measuring and calculating, a supportable data flow rate in the network so that the data flow initiated by the source can flow through the network without loss of data.

20. A computer readable medium containing executable program instructions for achieving an end-to-end data flow rate supported by a communications network having a source and a destination interconnected by communication links, the executable program instructions comprising program instructions for:

initiating a data flow at the source over the links, the data flow comprising a plurality of packet pairs paced out over a predetermined time interval;

measuring an amount of data received at the destination over the predetermined time interval;

measuring a packet gap for the packet pairs at the destination over the predetermined time interval;

calculating an expected packet gap based on previously extended credits;

determining if the measured packet gap is equal to or greater than the expected gap, or less than the expected gap; and determining a supportable data flow rate in the network so that the data flow initiated by the source can flow through the network without loss of data.

* * * * *

UNITED STATES PATENT AND TRADEMARK OFFICE
CERTIFICATE OF CORRECTION

| | |
|---|---|
| PATENT NO. | : 7,035,220 B1 |
| APPLICATION NO. | : 10/038329 |
| DATED | : April 25, 2006 |
| INVENTOR(S) | : Simcoe |

It is certified that error appears in the above-identified patent and that said Letters Patent is hereby corrected as shown below:

In column 4, at line 40, delete "1B" and insert --IB--.
In column 12, at line 60, delete "packe" and insert --packet--.

Signed and Sealed this

Thirtieth Day of October, 2007

JON W. DUDAS
*Director of the United States Patent and Trademark Office*